United States Patent [19]

Estes et al.

[11] Patent Number: 5,545,704
[45] Date of Patent: Aug. 13, 1996

[54] METHOD FOR PRODUCING ALKOXYSILALKYLENE TERMINATED SILOXANE POLYMERS

[75] Inventors: Tara N. Estes; Robert H. Krahnke, both of Midland, Mich.

[73] Assignee: Dow Corning Corporation, Midland, Mich.

[21] Appl. No.: 506,291

[22] Filed: Jul. 24, 1995

[51] Int. Cl.$^6$ .................................................. C08G 77/08
[52] U.S. Cl. .......................... 528/15; 528/12; 528/23; 528/32; 528/33; 528/38
[58] Field of Search .............................. 528/15, 32, 33, 528/23, 12, 38

[56] References Cited

U.S. PATENT DOCUMENTS 3,175,993  3/1965  Weyenberg .
4,599,394  7/1986  Lucas .
4,772,675  9/1988  Klosowski et al. .
4,847,400  7/1989  Krahnke et al. .
4,962,174  10/1990  Bilgrien et al. .
5,017,672  5/1991  Krahnke et al. .

*Primary Examiner*—Melvyn I. Marquis
*Attorney, Agent, or Firm*—James E. Bittell

[57] ABSTRACT

A method is described of producing alkoxysilalkylene enblocked polydiorganosiloxane in two steps. First, silanol terminated polydiorganosiloxane is capped with an SiH containing silazane in the presence of an acid catalyst. Then, that polymer is reacted with an alkoxy functional alkenylsilane in the presence of a hydrosilylation catalyst to give the desired polymer. The polymers are useful in formulating room temperature curing sealants.

16 Claims, No Drawings

METHOD FOR PRODUCING ALKOXYSILALKYLENE TERMINATED SILOXANE POLYMERS

This invention relates to a two-step process for preparing alkoxysilalkylene terminated siloxane polymers from conventional silanol terminated siloxane polymers. Alkoxysilalkylene terminated siloxane polymers are siloxane polymers where the terminal silicon atom has two or three alkoxy groups attached, and the terminal silicon is attached to the siloxane chain through an alkylene linkage.

BACKGROUND OF THE INVENTION

Alkoxysilalkylene terminated siloxanes are used to prepare room temperature vulcanizing (RTV) silicone sealants which employ titanate catalysts to facilitate cure upon exposure of the sealant to atmospheric moisture. U.S. Pat. No. 4,772,675 teaches that RTV silicone sealants prepared with such alkoxysilalkylene terminated siloxane polymers have greatly improved shelf-life compared to similar sealants prepared from more conventional alkoxysilyl terminated siloxanes, in which the terminal group is bonded to the next silicon through an oxygen link.

Weyenberg teaches in U.S. Pat. No. 3,175,993, issued Mar. 30, 1965, organopolysiloxanes having terminal alkoxylated silcarbane groups. Alkoxylated silcarbane groups are equivalent to alkoxysilalkylene groups. A method of preparation is shown which reacts an SiH endblocked polydiorganosiloxane with an alkoxy silane having an aliphatically unsaturated group in the presence of a platinum catalyst. However, this patent does not disclose a method for conveniently obtaining the required SiH endblocked polydiorganosiloxane precursor.

More recently, Lucas teaches in U.S. Pat. No. 4,599,394 the preparation of these polymers by the platinum catalyzed addition of an alkoxy-functional SiH compound with vinyl-ended polydimethylsiloxane.

There are some significant limitations to the practical use of the Weyenberg and Lucas approaches of making these polymers. The Weyenberg approach teaches the use of silicon-hydride-ended polymers, which are not commonly available. An economical method of producing these precursors is not given. The Lucas approach requires the use of trimethoxy- or triethoxy silane to cap the silicon-vinyl ended polymers and these silanes have significant toxicity concerns.

Compared to silicon-hydride-ended polymers or silicon-vinyl-ended polymers, silanol-ended polymers are cheaper and more readily available. Silanol-ended polymers are the basis for most of the current sealant products. It is, therefore, of interest to find a route to polymers endblocked with alkoxysilalkylene groups, starting from the commercially available silanol-ended polymers.

One such route was discovered by Krahnke and Saam and disclosed in U.S. Pat. Nos. 4,847,400 and 5,017,672. In this single step route, a silanol polymer is capped with a silazane having the trialkoxysilylethylene linkage, $((MeO)_3SiC_2H_4Me_2Si)_2NH$, in the presence of an acid catalyst, such as acetic acid (HOAc), trifluoroacetic acid, or dodecylbenzenesulfonic acid. Although all these catalysts were capable of producing a polymer that could be used in a sealant, each had its disadvantages. Acetic acid is inefficient and requires high concentrations and long times to complete capping. Dodecylbenzenesulfonic acid is an efficient catalyst, but reacts with ammonia to give ammonium dodecylbenzene sulfonate, and the resulting polymers are cloudy due to the incompatibility. Trifluoroacetic acid is the catalyst of choice to produce a clear polymer efficiently.

Development work has shown, however, that a significant amount of condensation occurs between the silanol end of the polymer and the alkoxy group of the silazane endcapper to cause chain extension and an increase in viscosity during the capping reaction. This viscosity increase may reduce the extrusion rate of the compounded sealant below acceptable limits.

Bilgrien et. al. teach another route in U.S. Pat. No. 4,962,174. An alkoxysilethylene endblocked polydiorganosiloxane is produced by first reacting hydroxyl endblocked polydiorganosiloxane with excess SiH compound having from 2 to 4 SiH groups, in the presence of a platinum catalyst, then reacting that product with vinyltrialkoxysilane to give the desired polymer. The SiH compounds include silanes, disilanes, and disiloxanes, and the preferred excess is 10 moles of SiH for each mole of SiOH present. This process is somewhat inefficient, as demonstrated by the large excess of SiH compound required. Further, some loss in sealant properties is incurred on shelf aging, due to incomplete conversion of SiOH, even with the excess SiH reagent.

SUMMARY OF THE INVENTION

This invention relates to a method of producing an alkoxysilalkylene terminated polydiorganosiloxane, suitable for use in a sealant. This is done by (A) first, mixing a diorganosiloxane polymer having at least one silanol end-group with a first capping agent comprising a silicon-hydride functional silazane and an acid catalyst, then heating them to a temperature of from 25° to 150° C. for a time sufficient to react essentially all of the hydroxyl groups of the polydiorganosiloxane. This leaves an SiH endblocked polymer without an appreciable increase in molecular weight of the starting polymer. Then, in the second step (B), sufficient alkoxy functional alkenylsilane is added to react with the SiH groups on the polymer of step (A), with sufficient platinum or other hydrosilylation catalyst to promote the addition reaction, and the mixture is heated to a temperature of from 25° to 150° C. for a period of time sufficient to react essentially all of the SiH groups present.

DESCRIPTION OF THE PREFERRED EMBODIMENTS

The method of this invention produces an alkoxysilalkylene terminated polydiorganosiloxane, suitable for use in sealants. The diorganosiloxane polymer having at least one silanol end-group of step (A) includes linear polymers with one or both ends being endblocked by SiOH. Where both ends are endblocked, the polymer is of the formula $HOSiR_2O(SiR_2O)_xSiR_2OH$, where x is of a value such that the polymer has a viscosity of from 0.1 to 3000 Pa.s at 25° C. R is any of those monovalent hydrocarbon, or monovalent halohydrocarbon radicals of 1 to 18 inclusive carbon atoms which are known to be useful in silicone sealant materials. The preferred viscosity of the polymer is from 1 to 1000 Pa.s at 25° C. Lower viscosities give cured sealants which are very hard with high modulus because of the high amount of crosslinking while higher viscosities give sealants with a very low extrusion rate. The preferred radicals for R are methyl, ethyl, propyl, phenyl, and trifluoropropyl, with methyl most preferred. The methods of manufacture of these hydroxyl endblocked polydiorganosiloxanes are well known in the art. One common method is based upon the hydrolysis of diorganodichlorosilane, the separation of the tetrasiloxane cyclic material from the hydrolysis mixture, and the subsequent polymerization of the cyclic material to the polydiorganosiloxane through the use of an alkaline catalyst.

To vary the physical properties of the final sealant, a polymer with fewer functional groups available for crosslinking may be desired. When this is the case, some of the hydroxyl endblocked polymer is capped on one end with a trimethylsiloxy endblocker to give a polymer of the formula $Me_3SiO(R_2SiO)_xSiR_2OH$, where Me represents methyl, and R and x are described above. An example of a trimethylsiloxy endblocker is hexamethyldisilazane. A polymer with 10 to 15 percent of its ends capped with trimethylsiloxy groups, leaving 85 to 90 percent of its ends capped with SiOH, has been found to be useful.

The first capping agent of step A comprises a silicon-hydride functional silazane of the formula $(HR_2Si)_2NH$, where R represents a saturated alkyl or aryl radical, such as methyl, ethyl, propyl, or phenyl. These silazanes are well known in the art. The preferred silazane is tetramethyldisilazane, having the formula $HMe_2SiNHSiMe_2H$.

The reaction in step A is catalyzed with an acid catalyst of the type described in U.S. Pat. No. 5,017,672, which is hereby incorporated by reference. Preferred catalysts are acetic acid and trifluoroacetic acid.

The SiH endblocked polymer formed in step (A) is reacted in step (B) with an alkoxy functional alkenylsilane of the formula $(R'O)_aR''_{3-a}SiZ_bCH=CH_2$. R' is selected from the group consisting of alkyl radicals or haloalkyl radicals having no halogen alpha to the oxygen, both of less than 5 carbon atoms. R" is free of aliphatic unsaturation, and is selected from the group consisting of monovalent hydrocarbon radicals and monovalent halohydrocarbon radicals, with 1 to 18 carbon atoms. a has a value of 2 or 3. Z is a divalent hydrocarbon radical free of aliphatic unsaturation of from 0 to 8 inclusive carbon atoms. b has a value of 0 or 1. Examples of alkenyl silanes include vinyltriethoxysilane, hexenyltrimethoxysilane, allyltrimethoxysilane, hexenylmethyldimethoxysilane, and vinylphenyldimethoxysilane. The preferred alkenylsilanes are vinyltrimethoxysilane, and vinyltriethoxysilane.

Any of the well known hydrosilylation catalysts, including those described by Weyenberg in U.S. Pat. No. 3,175,993 or Lucas in U.S. Pat. No. 4,599,394, which are hereby incorporated by reference, are useful. Examples include chloroplatinic acid, platinum on charcoal and platinum on alumina. A preferred catalyst is a divinyltetramethyldisiloxane complex of chloroplatinic acid.

The process of making the alkoxysilylalkylene endblocked polydiorganosiloxane according to the present invention does not require highly controlled reaction conditions. Generally, 0.5 to 1.5 moles of silazane per mole of SiOH present in the polymer is used in the first step. The use of some excess silazane is preferred because it minimizes the amount of unreacted silanol that may remain after the reaction. Unreacted silanol is undesirable because it may cause undesired hydrogen evolution in the second step, potential viscosity increase, and lead to failure to cure in the subsequent sealant after long term storage.

Preferred catalyst concentrations for acetic acid or trifluoroacetic acid are in the range of 100 ppm to 2500 ppm, based on the weight of the polymer. Concentrations below 100 ppm may lead to incomplete capping of silanol, and make the polymers susceptible to gelation on exposure to atmospheric moisture during long term aging. Concentrations above 2500 ppm may cause polymers to develop significant cloudiness due to salt formation with byproduct ammonia. A preferred amount of acid catalyst is 100 to 300 ppm. The reaction is carried out at temperatures from 25° to 150° C. The lower temperature may depend upon the catalyst type and concentration used, while the upper temperature is limited by the rate at which the silazane evaporates and becomes unavailable to the reaction. The preferred temperature for this step is 60° C. At this temperature the reaction is generally complete in 30 to 60 minutes.

In the second step, a slight excess of the alkoxy functional alkenylsilane endblocker is added to react with the SiH groups present on the polymer ends. A suitable amount is from 1.05 to 3.0 moles of alkenylsilane per SiH group present. The reaction of the unsaturated groups on the alkenylsilane and the SiH is catalyzed with a hydrosilylation catalyst. A suitable amount of the catalyst is easily determined by experimentation. An amount giving 0.65 to 25 ppm of platinum based on the polymer weight has been found to be useful when using a divinyltetramethyldisiloxane complex of chloroplatinic acid.

The alkoxysilalkylene endblocked polyorganosiloxane produced by the method of this invention is particularly suitable for use in any of the well known compositions which require alkoxy endblocked polydiorganosiloxanes as an ingredient in producing silicone sealants which cure upon exposure to moisture. In particular, they are useful in curable compositions using a chealated titanium catalyst. They are also used with other cure systems that are known in the art, for example with tin catalyst. Silicon dioxide and other inorganic fillers may be used successfully in such sealants to improve physical properties.

The usefulness of the polymers produced by this process in formulating sealants was shown by comparing such formulations to similar compositions which are made using polymer produced by the method disclosed in U.S. Pat. No. 4,847,400, instead of the polymer produced by the method of this invention. The polymer of this invention showed dramatically less viscosity increase during compounding than the comparison sample. Aging both the sealant of this invention and the comparison sealant for two weeks showed the two polymers to produce sealants of comparable stability.

This process has the advantage of using readily available silanol-endblocked siloxane polymers as starting materials, as well as commonly available reagents and catalysts. The amounts of reagents used minimize byproducts that must be removed or may affect polymer or sealant properties on long term storage.

The following examples are included for illustrative purposes only and should not be construed as limiting the invention, which is set forth in the claims.

EXAMPLE 1

400 grams of a silanol-ended polydimethylsiloxane having a viscosity of 53 Pa.s and 535 ppm hydroxyl by weight (0.0126 mol OH, approximately all of the polymer endgroups), and 1.4 g (0.0105 mol) of tetramethyldisilazane were mixed in a kettle, and heated to 65° C. Next, 0.080 g ($7.04 \times 10^{-4}$ mol) trifluoroacetic acid was added and mixed for 30 minutes.

Then, 3.14 g (0.0212 mol) of vinyltrimethoxysilane was added, and mixed for 30 minutes. Finally, 1.62 g of a chloroplatinic acid complex of divinyltetramethyldisiloxane, diluted with dimethylvinylsiloxy endblocked polydimethylsiloxane to provide 0.7 wt. % platinum in the catalyst mixture, was added, to give a Pt concentration of 28 ppm. Mixing continued at 65°–70° C. for 2 hours.

The viscosity of the polymer increased from 53 Pa.s to 76 Pa.s due to incomplete capping by the silazane and subsequent chain extension.

A 5 g sample of the polymer was mixed with 0.1 g Ti(OBu)$_4$. No immediate thick phase formed, and the polymer began to gel in 10 minutes. This means at least 85 percent of the available SiOH ends were reacted. Uncapped silanol-ended polymer tested in this way would gel immediately.

After 4 days at room temperature, 50% relative humidity, the cured polymer was extracted overnight in refluxing toluene, and the weight loss was found to be 8.6%. This showed that the polymer was well incorporated into the cured network.

EXAMPLE 2

A silanol-ended polydimethylsiloxane with some of the silanol groups capped with Me$_3$Si, (4000 g, viscosity 14.8 Pa.s, 15% Me$_3$Si endblocked, 0.138 mol OH), and tetramethyldisilazane (20.32 g, 0.153 moles) were added to a vessel, and mixed for 90 minutes, reaching a maximum temperature of 34° C. Next, trifluoroacetic acid (0.80 g, 7.02×10$^{-3}$ moles) was added and mixed for 15 minutes. The resulting capped polymer was then stripped for 60 minutes with mild external heating to remove volatile byproducts from the reaction.

Vinyltrimethoxysilane (45.20 g, 0.305 mol) was added to the above polymer and then mixed for 15 minutes. Then 4.00 g of a divinyltetramethyldisiloxane complex of chloroplatinic acid, diluted with dimethylvinylsiloxy-endblocked polydimethylsiloxane to provide 0.7 weight percent platinum in the catalyst mix, was added to give 7 ppm platinum in the polymer mix.

The materials were mixed for 2 hours achieving a maximum temperature of 58° C. The final capped polymer had a viscosity of 17 Pa.s, compared to 14.8 Pa.s before capping. The polymer was analyzed using Fourier Transform Infrared (FTIR), to show that most of the SiOH had been capped, and that, subsequently, no SiH remained. The analytical results are presented in Table 1.

TABLE 1

| | | FTIR Absorbance | | |
|---|---|---|---|---|
| | | Before reaction | After reaction | |
| SiOH | (ppm) | 545 | 63 | (11.6% remained) |
| SiH | (normalized abs.) | 1.4455 | 0 | (0% remained) |
| SiVi | (normalized abs.) | 0.1822 | 0.0480 | (26.4% remained) |

Absorbance measured after subtraction of polydimethylsiloxane

A sealant base was prepared by mixing 1000 g of the polymer, prepared above, with 100 g of a dimethyldichlorosilane-treated-fumed silica, with surface area of 170 m$^2$/g, for 15 minutes under a vacuum of 84 kPa (25 inches of mercury) to remove entrapped air.

A sealant was prepared from this base by adding a premix of 43 g of dimethyldimethoxysilane curing agent and 16 grams of tetrabutyltitanate catalyst to the sealant base and mixing for an additional 3.5 minutes at medium speed, and an additional 1.5 minutes at medium speed under a vacuum of 84 kPa (25 inches of mercury).

The sealant was transferred to sealant tubes and centrifuged for 30 minutes to remove any air entrained during the tube filling process. The tubes of sealant were divided into two groups. One group of tubes was aged for 1 week at room temperature, 23° C. The other tubes were aged for 1 week at 70° C. A week at 70° C. has been found to approximate 1 year at room temperature. After one week, the sealants in both sets of tubes were tested for various physical properties in the cured and uncured state. The results are summarized in Table 2.

A comparison sealant was made by a process disclosed in U.S. Pat. No. 4,847,400. The polymer of this comparison had an initial viscosity of 38 Pa.s and a final viscosity of 88 Pa.s, after capping with the silazane having the trialkoxysilylethylene linkage, ((MeO)$_3$SiC$_2$H$_4$Me$_2$Si)$_2$NH. The values for extrusion rate and slump reflect the use of a more viscous polymer.

This comparison shows that the sealants made by the new process retain their properties over seven days as well as, or better than, those made by the process disclosed in U.S. Pat. No. 4,847,400. A drop in modulus, an increase in tack-free time, and an increase in extractables all indicate incomplete silanol capping and subsequent degradation of the comparison polymer.

TABLE 2

| Properties | This invention 1 week at 25° C. | This invention 1 week at 70° C. | Comparison 1 week at 25° C. | Comparison 1 week at 70° C. |
|---|---|---|---|---|
| Durometer -- Shore A | 25 | 27 | 26 | 22 |
| Tensile -- psi | 267 (1840 kPa) | 280 (1930 kPa) | 339 (2340 kPa) | 281 (1940 kPa) |

TABLE 2-continued

| Properties | This invention 1 week at 25° C. | This invention 1 week at 70° C. | Comparison 1 week at 25° C. | Comparison 1 week at 70° C. |
|---|---|---|---|---|
| Elongation % | 293 | 327 | 400 | 501 |
| 100% Modulus -- psi | 86 (590 kPa) | 85 (590 kPa) | 76 (530 kPa) | 52 (360 kPa) |
| Extrusion rate -- g./min. | 297 | 313 | 80 | 95 |
| Slump -- in./min. | 3.86 (9.8 cm) | 3.9 (9.91 cm) | 0.5 (1.3 cm) | 0.26 (0.66 cm) |
| Skin-over time -- min. | 5 | 74 | 10 | 5 |
| Tack-free time -- min. | 26 | 36 | 13 | 32 |
| 96 Extractables -- % | 9.7 | 11.1 | 9.5 | 14.4 |

Cured sealant properties were measured on samples cured for 7 days at 25±1° C., 50±4% relative humidity. Durometer is Shore A type, measured by ASTM D2240. Tensile, elongation, and modulus were measured by ASTM D412.

Extrusion rate is the weight per minute of the uncured sealant extruded through a ⅛ inch (3.2 mm) orifice when the sealant is under a pressure of 90 psi (620 kPa). Slump is measured on uncured sealant by ASTM D2202, where slump, or flow, is measured 10 minutes from the start of the test.

The skin over time is defined as the time in minutes required for the material to cure to the point where it no longer adheres to a clean fingertip lightly applied to the surface. The cure conditions are 23° C. and 50 % relative humidity.

The tack free time is defined as the time in minutes required for a curing material to form a non-tacky surface film. A sample is spread on a clean smooth surface and timing is begun. Periodically, a clean strip of polyethylene film is laid upon a fresh surface, light finger pressure is applied to it, then the finger is removed and the strip gently pulled off. The time when the strip pulls cleanly away from the sample is recorded as the tack free time.

Extractables are given in percent weight loss and are a measure of polymer not chemically crosslinked into cured sealant. A 2 g sample of cured sealant is cut into cubes ¹⁄₁₆ in (1.6 mm) on each side. The sample is placed into a toluene reflux for 24 hours, followed by drying for 24 hours overnight under vacuum. The weight of the sample is then taken to determine how much polymer was removed.

EXAMPLE 3

1000 g of silanol-ended polydimethylsiloxane of viscosity 50 Pa.s, having 540 ppm hydroxyl (0.032 mol OH), and 4.21 g (0.032 mol) of tetramethyldisilazane were added to a vessel. The mixture stirred for 15 minutes, until the temperature stabilized at 60° C. Then, 0.21 g (0.0035 mol, or 200 ppm based on the total mixture) of acetic acid was added. The materials were mixed at 30 minutes at 60° C. until the SiOH was capped to give the SiH endblocked polymer.

Then, 9.37 g (0.063 mol) vinyltrimethoxysilane was added and mixed for 15 minutes at 60° C. 1.00 g of chloroplatinic acid catalyst complex of divinyltetramethyldisiloxane, diluted with dimethylvinylsiloxy-endblocked polydimethylsiloxane to provide 0.7 wt. % platinum in the catalyst mix, was added to the mixture to give a platinum concentration in the polymer of 7 ppm. The mixing continued for two hours at 60° C.

The polymer was analyzed using FTIR, to show that most of the SiOH had been capped. The analytical results are presented in Table 3. The polymer had starting viscosity of 51.8 Pa.s and a final viscosity, after the capping reactions, 56 Pa.s.

TABLE 3

| | | FTIR Absorbance | | |
|---|---|---|---|---|
| | | Before reaction | After reaction | |
| SiOH | (ppm) | 540 | 12.4 | (2.3% remained) |
| SiH | (normalized abs.) | 1.3779 | 0.0146 | (1.1% remained) |
| SiVi | (normalized abs.) | 0.1407 | 0.0010 | (0.8% remained) |

Absorbance measured after subtraction of polydimethylsiloxane

A sealant base was prepared by mixing 65 g of a dimethyldichlorosilane-treated fumed silica into 650 g of the example polymer for 5 minutes at a medium speed in a mixer capable of heat and vacuum. The mixing continued for an additional 7 minutes under 26 inches (88 kPa) of vacuum to remove entrapped air. The base was transferred to sealant tubes and centrifuged for 30 minutes to remove any air entrained during the tube filling process.

A sealant was prepared by adding 5 parts (4.7%) dimethyldimethoxysilane curing agent and 1.6 parts (1.5%) tetrabutyltitanate catalyst per 100 parts (93.8%) polymer by injection into the tubes of the above base, and mixing for 5 minutes on mixers suitable for distributing the additives in the tubes. The tubes of sealant were centrifuged for 30 minutes and deaired to remove any air incorporated during the addition and mixing of the catalyst and curing agent.

The tubes of sealant were divided into three groups. One group of tubes was aged for 1 week at room temperature, −25° C. Another group was aged for 1 week at 70° C. A third group was aged for two weeks at 70° C.

After aging, the sealants in the three sets of tubes were tested for various physical properties in the cured and uncured state. The results are summarized in Table 4. The data show good retention of physical properties under the different conditions.

TABLE 4

| Sealant Properties | 1 week, 25° C. | 1 week, 70° C. | 2 weeks, 70° C. |
| --- | --- | --- | --- |
| Durometer -- Shore A | 28 | 28 | 30 |
| Tensile -- psi | 355 (2450 kPa) | 365 (2520 kPa) | 388 (2680 kPa) |
| Elongation % | 380 | 430 | 390 |
| 100% Modulus -- psi | 84 (579 kPa) | 80 (552 kPa) | 96 (670 kPa) |
| Extrusion rate -- g/min | 145.4 | 159.1 | 160.2 |
| Slump -- in/min | 4+ (10+ cm/min) | 4+ (10+ cm/min) | 3.7 (9.4 cm/min) |
| Skin-over time -- min | 22 | 20 | 19 |
| Tack-free time -- min | 34 | 45 | 73 |
| Extractables, % | 8.2 | 8.7 | 10.4 |

What is claimed is:

1. A process for forming alkoxysilalkylene terminated diorganosiloxane polymer from silanol terminated diorganosiloxane polymer, the process comprising:
   A) forming a mixture of
      1) a diorganosiloxane polymer having at least one silanol end-group,
      2) a first capping agent comprising a silazane of the formula:

$(HR_2Si)_2NH$ where R represents a saturated alkyl or aryl radical, and
      3) an effective amount of an acid catalyst,
   B) reacting the mixture of step A at 25°–150° C.,
   C) after the silanol groups are capped by the first capping agent to form a polymer having SiH endgroups, adding to the mixture
      1) from about 1 to 3.0 moles of a second capping agent for each mole of SiH endgroup, the second capping agent comprising an alkoxy functional alkenylsilane of the formula $(R'O)_aR''_{3-a}SiZ_bCH=CH_2$ R' is selected from the group consisting of alkyl radicals and haloalkyl radicals having no halogen alpha to the oxygen, both of less than 5 carbon atoms, R" is free of aliphatic unsaturation, and is selected from the group consisting of monovalent hydrocarbon radicals and monovalent halohydrocarbon radicals both having 1 to 18, inclusive, carbon atoms, a has a value of 2 or 3, Z is a divalent hydrocarbon radical free of aliphatic unsaturation of from 0 to 8, inclusive, carbon atoms, and b has a value of 0 or 1; and
      2) an effective amount of hydrosilylation catalyst; and
   D) reacting by hydrosilylation to form diorganosiloxane polymer, having end-groups of the formula:

$(R'O)_aR''_{3-a}SiZ_bCH_2CH_2SiR_2O.$

2. The process as described in claim 1 where the silazane is tetramethyldisilazane.

3. The process as described in claim 1 where the mixture is formed of 0.5 to 1.5 moles of silazane per mole of silanol endgroups on the diorganosiloxane polymer.

4. The process as described in claim 3 where the mixture is formed of about one mol of silazane per mol of silanol endgroups on the diorganosiloxane.

5. The process as described in claim 1 where the acid catalyst is selected from a group comprising acetic acid, trifluoroacetic acid, phosphoric acid, trifluoromethane sulfonic acid, xylenesulfonic acid and dodecylbenzenesulfonic acid.

6. The process as described in claim 1 where the acid catalyst is acetic acid or trifluoroacetic acid, and is present in an amount of 10 ppm to 2500 ppm based on the weight of the polymer.

7. The process as described in claim 6 where the acid catalyst is acetic acid or trifluoroacetic acid present in an amount of 100 ppm to 300 ppm based on the weight of the polymer.

8. The process as described in claim 1 where the mixture is maintained at a temperature in the range of 25° to 150° C. to facilitate the reaction of the silazane with the silanol endgroups of the polymer.

9. The process as described in claim 1 where the mixture is maintained at a temperature of about 60° C. to facilitate the reaction of the silazane with the silanol endgroups of the polymer.

10. The process as described in claim 1 where about one mol of the alkenyl silane is added per mole of SiH endgroup of the polymer having SiH endgroups.

11. The process as described in claim 1 where the alkenylsilane is vinyltrimethoxysilane or vinylmethyldimethoxysilane.

12. The process as described in claim 1 where the hydrosilylation catalyst is a divinyltetramethyldisiloxane complex of chloroplatinic acid.

13. The process as described in claim 12 where sufficient catalyst is added to the mixture to provide a platinum concentration between 0.65 and 25 ppm.

14. The process as described in claim 12 where sufficient catalyst is added to the mixture to provide a platinum concentration between 3 and 10 ppm.

15. The process as described in claim 1 where the hydrosilylation reaction is facilitated by maintaining the mixture at a temperature between 30° C. and 150° C.

16. The process as described in claim 15 where the hydrosilylation reaction is facilitated by maintaining the mixture at a temperature between 60° C. and 90° C.

* * * * *